United States Patent
Takeda et al.

(10) Patent No.: US 11,582,713 B2
(45) Date of Patent: Feb. 14, 2023

(54) SYSTEM INFORMATION AND PAGING MONITORING FOR MULTIPLE SYNCHRONIZATION SIGNAL BLOCKS

(71) Applicant: QUALCOMM Incorporated, San Diego, CA (US)

(72) Inventors: Kazuki Takeda, Tokyo (JP); Yan Zhou, San Diego, CA (US); Tao Luo, San Diego, CA (US); Sony Akkarakaran, Poway, CA (US); Konstantinos Dimou, San Francisco, CA (US); Seyed Ali Akbar Fakoorian, San Diego, CA (US); Mostafa Khoshnevisan, San Diego, CA (US); Hamed Pezeshki, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 16/895,836

(22) Filed: Jun. 8, 2020

(65) Prior Publication Data

US 2021/0014823 A1 Jan. 14, 2021

Related U.S. Application Data

(60) Provisional application No. 62/871,545, filed on Jul. 8, 2019.

(51) Int. Cl.
*H04W 68/02* (2009.01)
*H04W 72/04* (2009.01)
(Continued)

(52) U.S. Cl.
CPC .......... *H04W 68/02* (2013.01); *H04L 1/1812* (2013.01); *H04W 72/042* (2013.01); *H04W 72/0413* (2013.01); *H04W 74/0833* (2013.01)

(58) Field of Classification Search
CPC .............. H04W 68/02; H04W 72/042; H04W 74/0833; H04W 72/0413; H04W 48/12;
(Continued)

(56) References Cited

U.S. PATENT DOCUMENTS

2014/0126512 A1  5/2014  Kim et al.
2016/0249222 A1  8/2016  Li et al.
(Continued)

FOREIGN PATENT DOCUMENTS

EP       3070986 A2    9/2016
WO   2019/031850 A1    2/2019
(Continued)

OTHER PUBLICATIONS

International Search Report and Written Opinion dated Sep. 18, 2020 from corresponding PCT Application No. PCT/US2020/036818.

*Primary Examiner* — Ayaz R Sheikh
*Assistant Examiner* — Tarell A Hampton
(74) *Attorney, Agent, or Firm* — Arent Fox, LLP

(57) ABSTRACT

A configuration to enable a UE to select a new CSS set to use for monitoring for PDCCH based on changing conditions at the UE. The apparatus may receive, from a base station, a first indication of a search space for monitoring for a channel for at least one of system information, paging, or user data. A first set of monitoring occasions based on the search space indicated by the base station. The apparatus may determine a second set of monitoring occasions different than the first set of monitoring occasions based on a condition experienced by the apparatus. The apparatus may monitor for the channel based on the second set of monitoring occasions determined by the apparatus.

30 Claims, 10 Drawing Sheets

(51) Int. Cl.
  *H04L 1/18*       (2006.01)
  *H04W 74/08*      (2009.01)
  *H04L 1/1812*     (2023.01)

(58) Field of Classification Search
  CPC . H04L 1/1812; H04L 25/0224; H04L 25/067; H04L 5/0044; H04L 5/006; H04L 5/0085; H04L 5/0096; H04L 5/0032; H04L 5/0023; H04L 5/001
  See application file for complete search history.

(56) References Cited

U.S. PATENT DOCUMENTS

| | | | |
|---|---|---|---|
| 2018/0310297 A1* | 10/2018 | Martin | H04W 4/02 |
| 2019/0021119 A1* | 1/2019 | Ng | H04W 48/10 |
| 2019/0253904 A1* | 8/2019 | Tsai | H04L 5/0053 |
| 2019/0254120 A1* | 8/2019 | Zhang | H04W 28/06 |
| 2020/0022108 A1 | 1/2020 | Chen et al. | |
| 2020/0053580 A1 | 2/2020 | Bagheri et al. | |
| 2020/0084747 A1* | 3/2020 | Hong | H04W 24/08 |
| 2020/0092833 A1 | 3/2020 | Agiwal et al. | |
| 2020/0100311 A1 | 3/2020 | Cirik et al. | |
| 2020/0120584 A1* | 4/2020 | Yi | H04L 5/0035 |
| 2020/0213978 A1* | 7/2020 | Iyer | H04L 5/0078 |
| 2020/0221428 A1 | 7/2020 | Moon | |
| 2020/0244528 A1* | 7/2020 | He | H04L 1/1812 |
| 2020/0280971 A1* | 9/2020 | Moon | H04L 5/0094 |
| 2020/0351682 A1* | 11/2020 | Cirik | H04W 52/0229 |
| 2020/0389847 A1* | 12/2020 | Deng | H04W 52/0219 |
| 2020/0389874 A1* | 12/2020 | Lin | H04L 5/0053 |
| 2020/0404617 A1* | 12/2020 | Murray | H04W 68/02 |
| 2021/0028883 A1* | 1/2021 | Wang | H04W 72/0446 |
| 2021/0028961 A1* | 1/2021 | Lee | H04W 48/16 |
| 2021/0212098 A1* | 7/2021 | Yoon | H04W 16/28 |
| 2021/0274562 A1* | 9/2021 | Takeda | H04W 56/001 |
| 2021/0297997 A1* | 9/2021 | Hwang | H04W 24/08 |
| 2021/0385800 A1* | 12/2021 | Harada | H04W 72/042 |
| 2021/0391955 A1* | 12/2021 | He | H04L 1/1861 |
| 2021/0392505 A1* | 12/2021 | Harada | H04L 5/001 |

FOREIGN PATENT DOCUMENTS

| | | |
|---|---|---|
| WO | 2019/050789 A1 | 3/2019 |
| WO | 2020055102 A1 | 3/2020 |

* cited by examiner

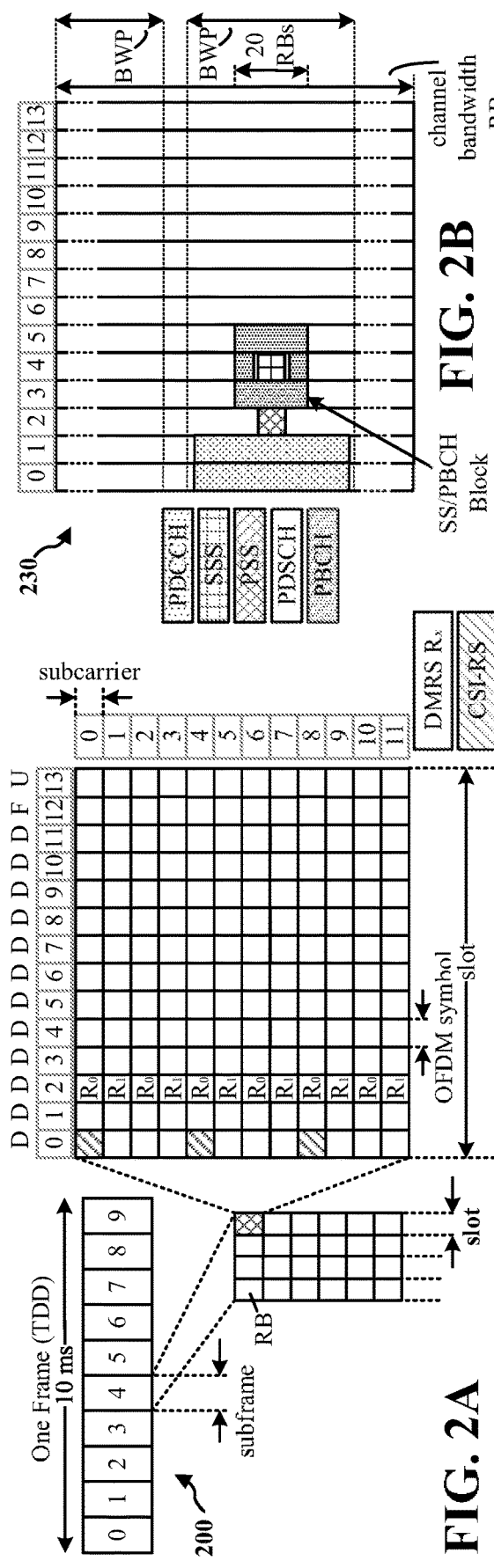
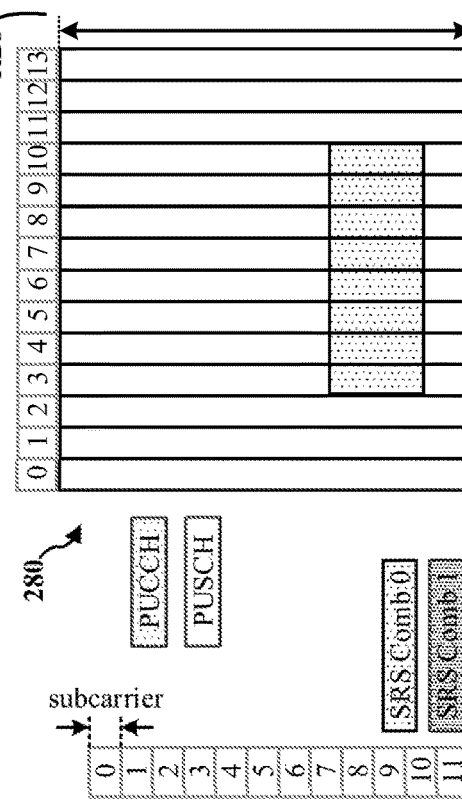
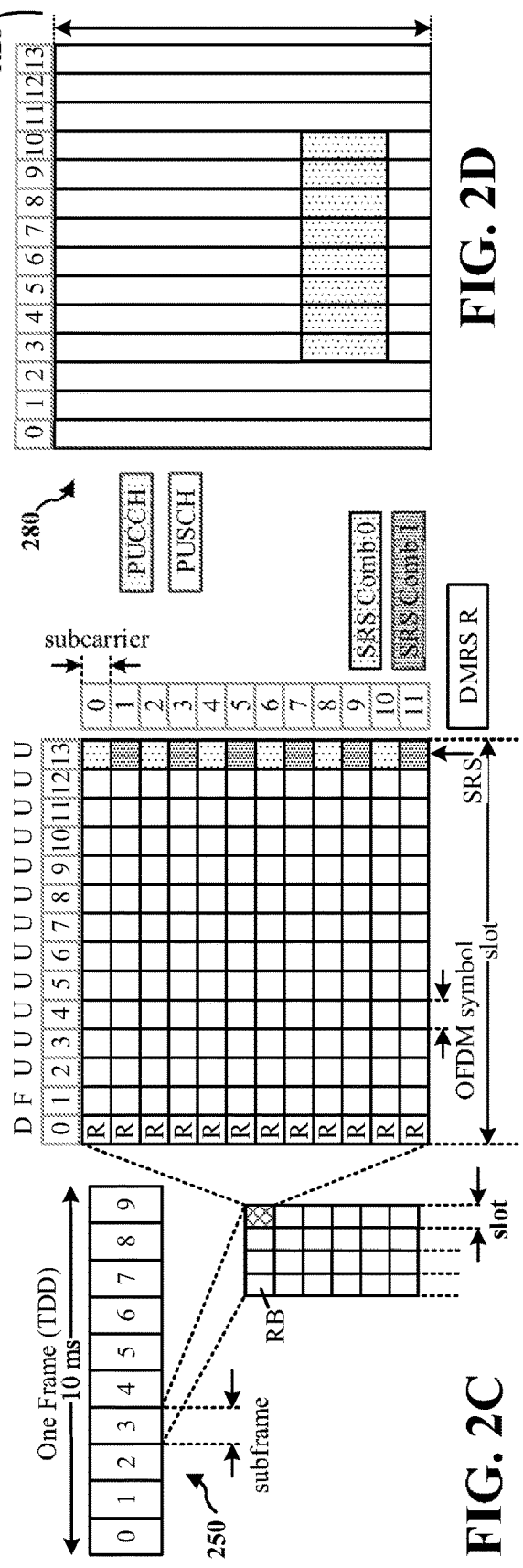
FIG. 2A
FIG. 2B
FIG. 2C
FIG. 2D

SYSTEM INFORMATION AND PAGING MONITORING FOR MULTIPLE SYNCHRONIZATION SIGNAL BLOCKS

CROSS REFERENCE TO RELATED APPLICATION(S)

This application claims the benefit of U.S. Provisional Application Ser. No. 62/871,545, entitled "System Information and Paging Monitoring for Multiple Synchronization Signal Blocks" and filed on Jul. 8, 2019, which is expressly incorporated by reference herein in its entirety.

BACKGROUND

Technical Field

The present disclosure relates generally to communication systems, and more particularly, to monitoring for system information and paging.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus may receive, from a base station, a first indication of a search space for monitoring for a channel for at least one of system information, paging, or user data, wherein a first set of monitoring occasions are based on the search space indicated by the base station. The apparatus may determine a second set of monitoring occasions different than the first set of monitoring occasions based on a condition experienced by the apparatus. The apparatus may monitor for the channel based on the second set of monitoring occasions determined by the apparatus.

In an aspect of the disclosure, a method, a computer-readable medium, and an apparatus are provided. The apparatus may be a device at a base station. The device may be a processor and/or a modem at a base station or the base station itself. The apparatus may send, to a UE in a connected mode, a first indication of a search space for monitoring for a channel for at least one of system information, paging, or user data, wherein a first set of monitoring occasions are based on the search space indicated by the apparatus. The apparatus may receive, from the UE, a second indication that the UE will change to monitoring a second set of monitoring occasions that is different than the first set of monitoring occasions indicated to the UE by the apparatus.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
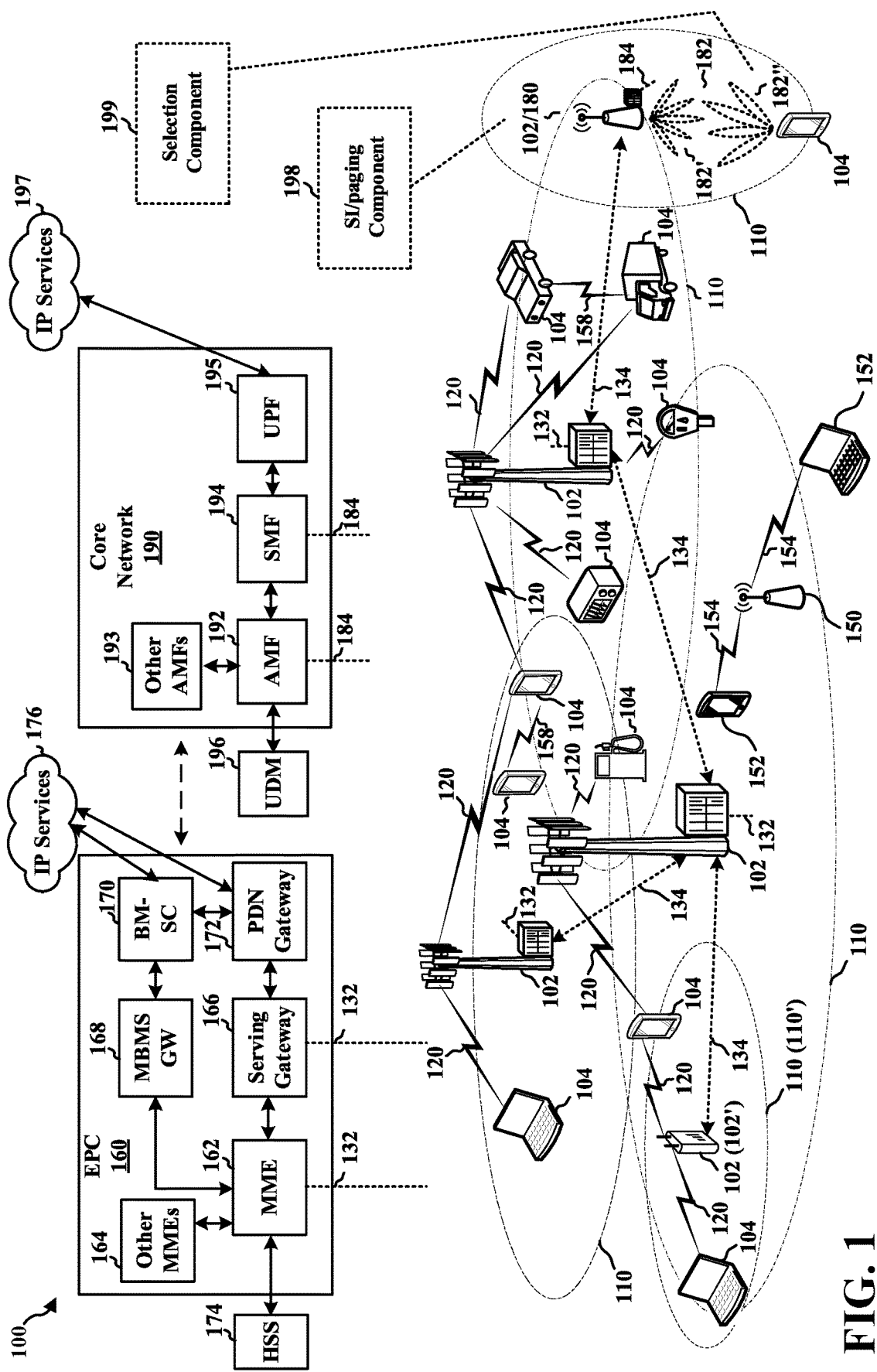
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, UE 104 may operate in a connected mode. The UE 104 may comprise a selection component 199 configured to determine a second set of monitoring occasions different than a first set of monitoring occasions based on a condition experienced by the UE 104. The selection component 199 may be configured to select new monitoring occasions without receiving a new indication/configuration from the base station 102/180. The UE 104 may receive, from base station 102/180, a first indication of a search space for monitoring for a channel for at least one of system information, paging, or scheduling information. The UE 104 may determine a first set of monitoring occasions based on the search space indicated by the base station 102/180. The UE 104 may determine a second set of monitoring occasions different than the first set of monitoring occasions based on a condition experienced by the UE. The UE may monitor for the channel based on the second set of monitoring occasions determined by the UE.

Referring again to FIG. 1, in certain aspects, the base station 102/180 may comprise a System Information (SI)/paging component 198 configured to receive, from the UE 102/180, a second indication that the UE will change to monitoring a second set of monitoring occasions that is different than the first set of monitoring occasions indicated to the UE by the base station. The base station 102/180 may send, to the UE 104 in a connected mode, a first indication of a search space for monitoring for a channel for at least one of system information, paging, or scheduling information. The first set of monitoring occasions may be based on the search space indicated by the base station. The base station may receive, from the UE, a second indication that the UE will change to monitoring a second set of monitoring occasions that is different than the first set of monitoring occasions indicated to the UE by the base station.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
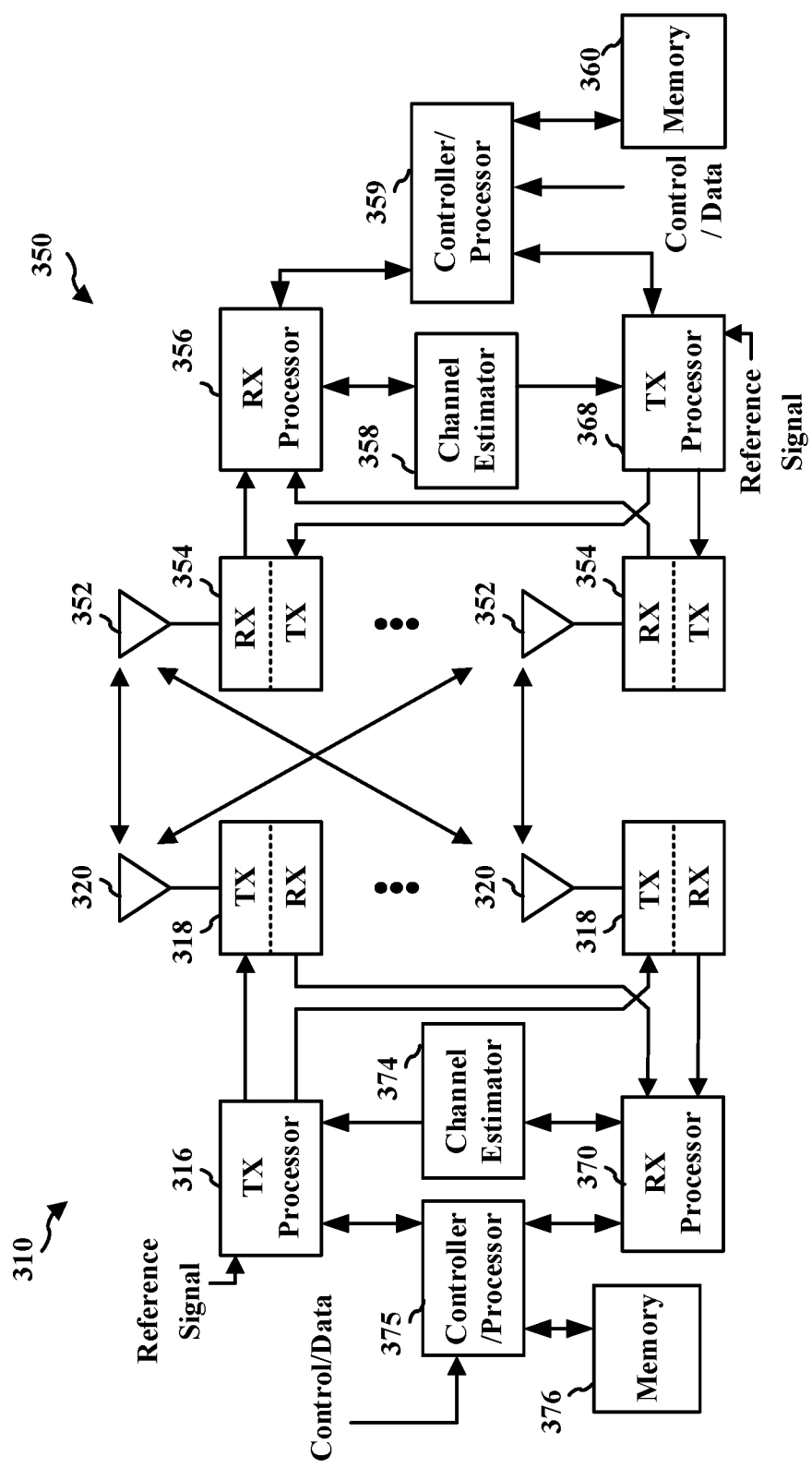
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 199 of FIG. 1.

At least one of the TX processor 316, the RX processor 370, and the controller/processor 375 may be configured to perform aspects in connection with 198 of FIG. 1.

Figure 4:
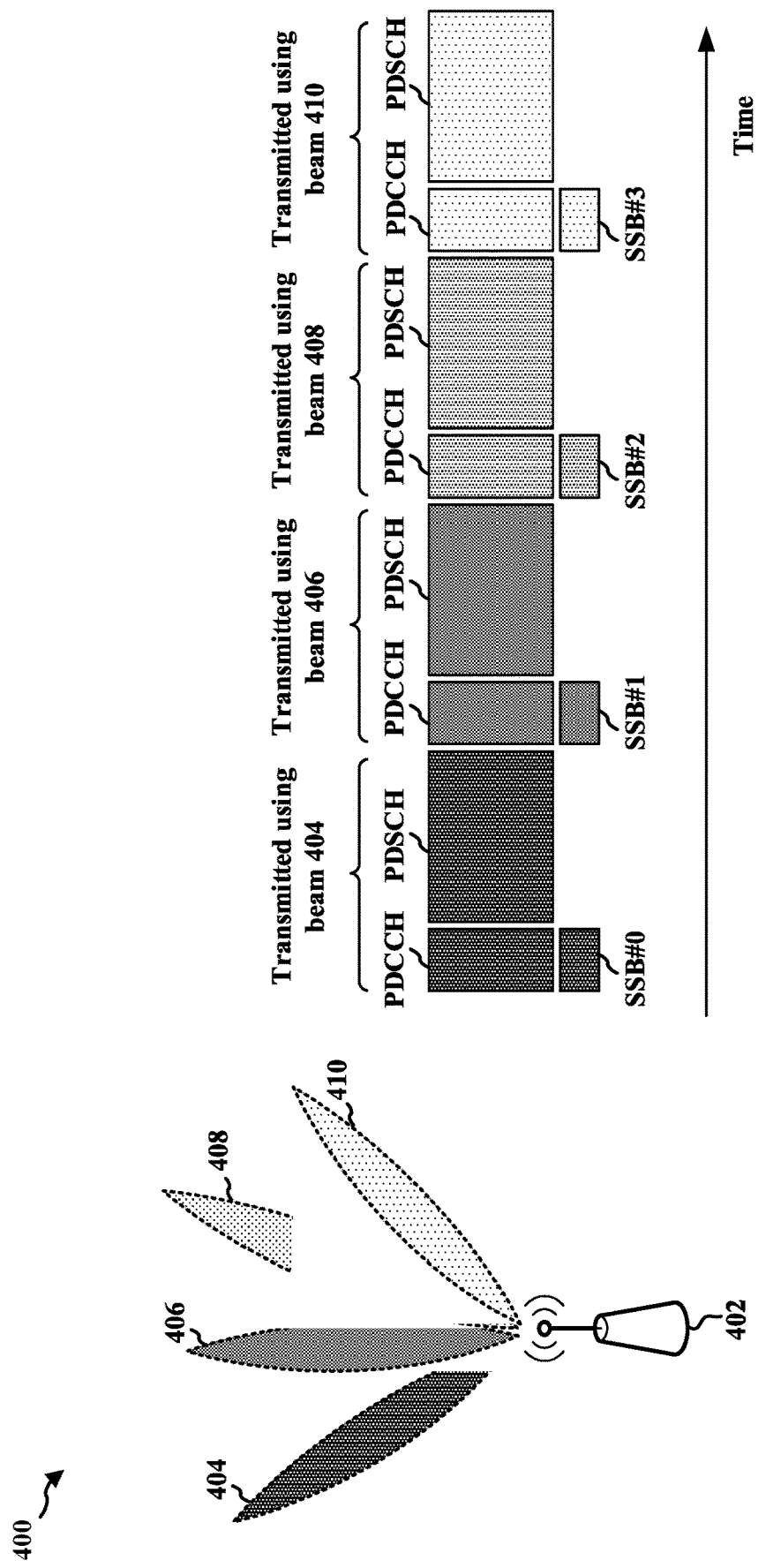
FIG. 4 illustrates example of transmission of multiple synchronization signal/physical broadcast channel blocks (SSBs).

System information and paging may be acquired by a UE from a base station. FIG. 4 illustrates an example 400 of a base station 402 transmitting an SS/PBCH block (SSB) such as described in connection with FIG. 2B. The illustration in FIG. 4 is merely one example. The resource mapping among SSB, PDCCH, and PDSCH may also be different than the illustration in FIG. 4. FIG. 4 merely illustrates the concept that an SSB #may be associated with PDCCH/PDSCH. The base station 402 may transmit the SSB multiple times, e.g., N times with N being a positive integer. Each of the N transmissions of the SSB may be transmitted using a different transmission beam from the base station. FIG. 4 illustrates the base station using beams 504, 506, 508, and 510 to transmit the SSB four times (e.g., SSB #0, SSB #1, SSB #2, SSB #3. Thus, in FIG. 4, N=4. The use of N=4 is merely an example to illustrate the concept. N may be selected to be any appropriate number based on the different beams used by the base station to transmit the SSB. The base station 402 may further transmit SI and paging N times, each of the transmissions of the SI/paging being associated with a corresponding one of the SSB transmissions.

In an RRC idle and/or an RRC inactive mode, a UE may select one of the SSBs and associated SI/paging occasions to monitor for SI/paging from the base station. The UE may select the SSB based on channel conditions for the respective SSBs. For example, the UE may select an SSB based on a received signal strength indicator (RSSI), reference signal received power (RSRP), reference signal received quality (RSRQ), and/or signal to interference and noise ratio (SINR) for the SSB. Thus, the UE may select a beam that is desirable for the UE and may monitor use the corresponding SSB to identify SI or paging occasions to monitor for SI or paging from the base station. The UE may select an SSB from among a group of SSBs having a best RSSI, a best RSRP, a best RSRQ, and/or a best SINR. If SSB qualities vary and a different SSB becomes preferable for the UE, the UE can change the SSB monitored by the UE. Thus, the UE may change the and SI/paging occasions monitored by the UE. The UE may make the change without notifying the change of the selected SSB/SI/paging used by the UE to the base station. Thus, the UE may make select a different SSB/SI/paging resources to monitor based on changing conditions experienced by the UE without being instructed by the base station to make the change.

When the UE is operating in a connected mode, e.g., an RRC connected mode, the UE may use indication(s) received from the base station to determine monitoring occasions for SSB, SI, and/or paging. For example, the UE and the network may use the indication(s) to help the UE and network to be aware of the SSB/SI/paging occasions monitored by the UE. The network may use the information to know when (e.g., in which monitoring occasion(s)) the UE monitors for PDCCH that schedules PDSCH for SI. Such monitoring occasions may be configured as part of Type0/0A-common search space (CSS) set configuration. The network may use the information to know when (e.g., in which monitoring occasion(s)) the UE monitors for PDCCH that schedules PDSCH for paging. Such monitoring occasions may be configured as part of Type2-CSS set configuration. The network may provide an indication to the UE instructing the UE to monitor a particular Type0/0A/2-CSS set. The indication may be provided, e.g., by a medium access control (MAC) control element (CE), e.g., if the Type0/0A/2-CSS set is the search space set having the identity #0 (i.e., search space (SS) SS #0). In another example, the UE may be configured for one or more monitoring occasions of the Type0/0A/2 CSS sets.

For example, if a UE is provided a zero value for a search space ID (e.g., searchspaceID) in a configuration for a control channel (e.g., PDCCH-ConfigCommon) for a Type0/0A/2 PDCCH CSS set, the UE may determine monitoring occasions for PDCCH candidates of the Type0/0A/2 PDCCH CSS set in a certain manner. As an example, for DCI formats with CRC scrambled by a C-RNTI, the UE may monitor corresponding PDCCH candidates at monitoring occasions associated with an SS/PBCH block, where the SS/PBCH block is determined by the most recent of (1) a MAC CE activation command indicating a TCI state of the active bandwidth part (BWP) that includes a control resource set (CORESET) with an index 0, where the TCI state includes a CSI-RS that is quasi-co-located (QCL) with the SS/PBCH block, or (2) a random access procedure that is not initiated by a PDCCH order that triggers a non-contention based random access procedure.

If a UE monitors PDCCH candidates for DCI formats with CRC scrambled by a C-RNTI and the UE is provided a non-zero value for the search space ID in the configuration for the control channel for a Type0/0A/2 PDCCH CSS set, the UE may determine monitoring occasions for PDCCH candidates of the a Type0/0A/2 PDCCH CSS set based on the search space set associated with the value of the indicated search space ID.

In both of these examples, the UE is limited in the ability to determine monitoring occasions for PDCCH candidates based on information provided to the UE from the network. These mechanism do not allow for quick beam changes at the UE to monitor for different PDCCH occasions for SI or paging. The mechanisms involve a network indication/configuration of new monitoring occasions for a connected UE and do not allow for a UE to make autonomous changes based on conditions experienced by the UE. A mobile UE may move relative to the base station, and a different monitoring occasion that is transmitted using a different beam may become easier for a UE to receive correctly. To address this challenge, a base station may configure the UE to monitor Type0/0A/2 PDCCH CSS sets associated with multiple beams. For example, a base station may even configure the UE to monitor Type0/0A/2 PDCCH CSS sets associated with some or all of the SSBs, which may be further associated to some or all of the beams used by the base station. While such a configuration might help ensure that the UE receives SI/paging, the use of Type0/0A/2 PDCCH CSS set associated with multiple beams would place an additional load on the UE for PDCCH monitoring. The added PDCCH monitoring consumes additional power that may reduce a battery life for the UE. As well, such a configuration may require additional transmissions of PDCCH from the base station.

Figure 6:
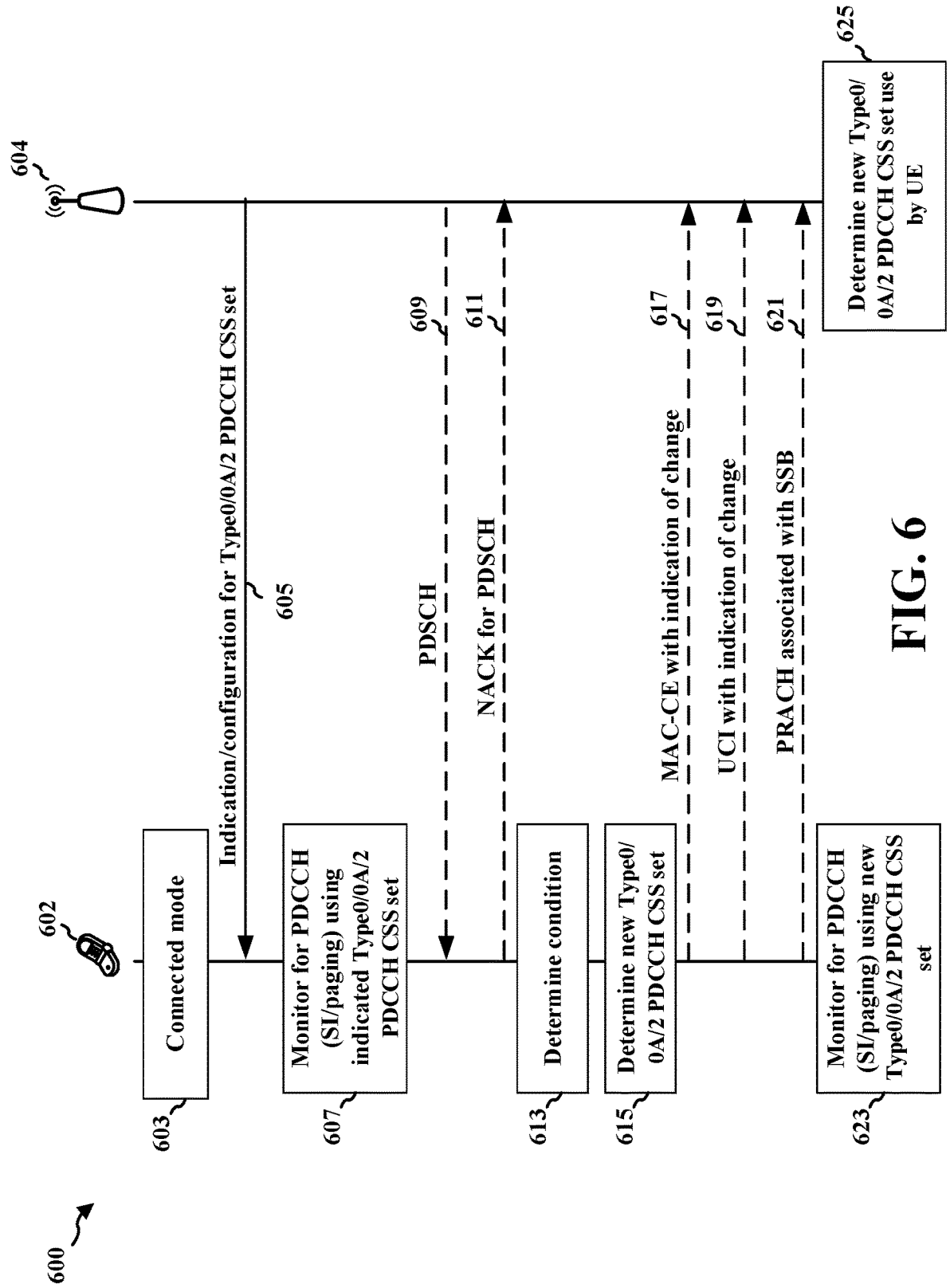
FIG. 6 illustrates a communication flow between a UE and a base station.

Aspects presented herein enable a UE in connected mode to change a Type0/0A/2 PDCCH CSS set used to monitor for PDCCH occasions based on conditions experienced at the UE and without receiving an indication of the change from a network and/or without receiving a configuration change from the network. FIG. 6 illustrates an example communication flow 600 between a UE 602 and a base station 604 based on aspects presented herein. As illustrated at 603, the UE may be operating in a connected mode, e.g., an RRC connected mode. The UE may receive an indication/configuration 605 from the base station that indicates a search space for monitoring a channel for at least one of system information, paging, or user data. In some aspects, the indication/configuration 605 may indicate a Type0/0A/2 PDCCH CSS set to be used to monitor for PDCCH. At 607, the UE may monitor for PDCCH, e.g., for SI or paging, using the Type0/0A/2 PDCCH CSS set based on the indication/configuration from the base station. At 613, the UE may determine a condition experienced by the UE. In response to determining the condition at 613, the UE, at 615, may determine a new set of monitoring occasions based on the condition experienced by the UE. In some aspects, in response to determining the condition at 613, the UE, at 615, may determine a Type0/0A/2 PDCCH CSS set to be used to monitor for PDCCH. At 623, the UE may use the new Type0/0A/2 PDCCH CSS set to monitor for PDCCH.

There are various examples of conditions that may be detected by the UE at 613 that may cause the UE to select a new Type0/0A/2 PDCCH CSS set.

In certain aspects, the UE may determine to change a Type0/0A/2 PDCCH CSS set used to monitor for PDCCH based on a quality measurement for a current Type0/0A/2 PDCCH CSS set. For example, the UE may determine to change the Type0/0A/2 PDCCH CSS set used to monitor for PDCCH when a Layer 1 (L1) or Layer 3 (L3) RSRP, RSRQ, RSSI, and/or SINR falls below a threshold for an SSB associated with the Type0/0A/2 PDCCH CSS set.

In some aspects, the UE may determine to change to a new Type0/0A/2 PDCCH CSS set to monitor for PDCCH based on a quality measurement for the new Type0/0A/2 PDCCH CSS set. For example, the UE may determine to change to the new Type0/0A/2 PDCCH CSS set to monitor for PDCCH when a L1/L3 RSRP, RSRQ, RSSI, and/or SINR exceeds a threshold for an SSB associated with the new Type0/0A/2 PDCCH CSS set.

In some aspects, the determination by the UE may be based on both a quality measurement associated with the current Type0/0A/2 PDCCH CSS set and a quality measurement associated with the new Type0/0A/2 PDCCH CSS set. For example, the UE may determine to change from a current Type0/0A/2 PDCCH CSS set to a new Type0/0A/2 PDCCH CSS set when both an L1/L3 RSRP, RSRQ, RSSI, and/or SINR falls below a threshold (e.g., threshold X) for an SSB associated with the current Type0/0A/2 PDCCH CSS set and a L1/L3 RSRP, RSRQ, RSSI, and/or SINR exceeds a threshold (e.g., threshold Y) for an SSB associated with the new Type0/0A/2 PDCCH CSS set. The thresholds X and Y may be the same. In another example, the thresholds X and Y may be different.

In some aspects, the UE may determine to change from a current Type0/0A/2 PDCCH CSS set to a new Type0/0A/2 PDCCH CSS set to monitor for PDCCH when a timing alignment (TA) timer expires for a primary cell (PCell) and/or for a primary timing advance group (pTAG). The TA timer is a configurable timer that the UE may use to determine timing alignment with the base station. For example, the UE may restart the TA timer when the UE receives a timing advance command from the base station. The base station may measure timing of uplink signals from the UE and may adjust the uplink transmission timing by sending timing advance command to the UE. Thus, if the UE has not received a timing advance command prior to expiration of the TA timer, the lack of a timing advance command may indicate that the UE has lost uplink synchronization with the base station. The TA timer may not expire while the UE is experiencing good conditions, because the UE will continue to receive timing advance commands from the base station that cause the UE to reset the TA timer. The expiration of the TA timer may indicate to the UE that the UE is not experiencing good conditions and can be used by the UE to trigger a selection of a new Type0/0A/2 PDCCH CSS set to use in monitoring for PDCCH.

In some aspects, the UE may determine to change from a current Type0/0A/2 PDCCH CSS set to a new Type0/0A/2 PDCCH CSS set to monitor for PDCCH when a number of HARQ retransmissions for a given HARQ process in a PCell exceeds a threshold number. Similar to the expiration of the TA timer, the HARQ retransmissions exceeding the threshold number may indicate to the UE that the UE is not experiencing good conditions and may be used by the UE to trigger a selection of a new Type0/0A/2 PDCCH CSS set to use in monitoring for PDCCH.

Figure 5:
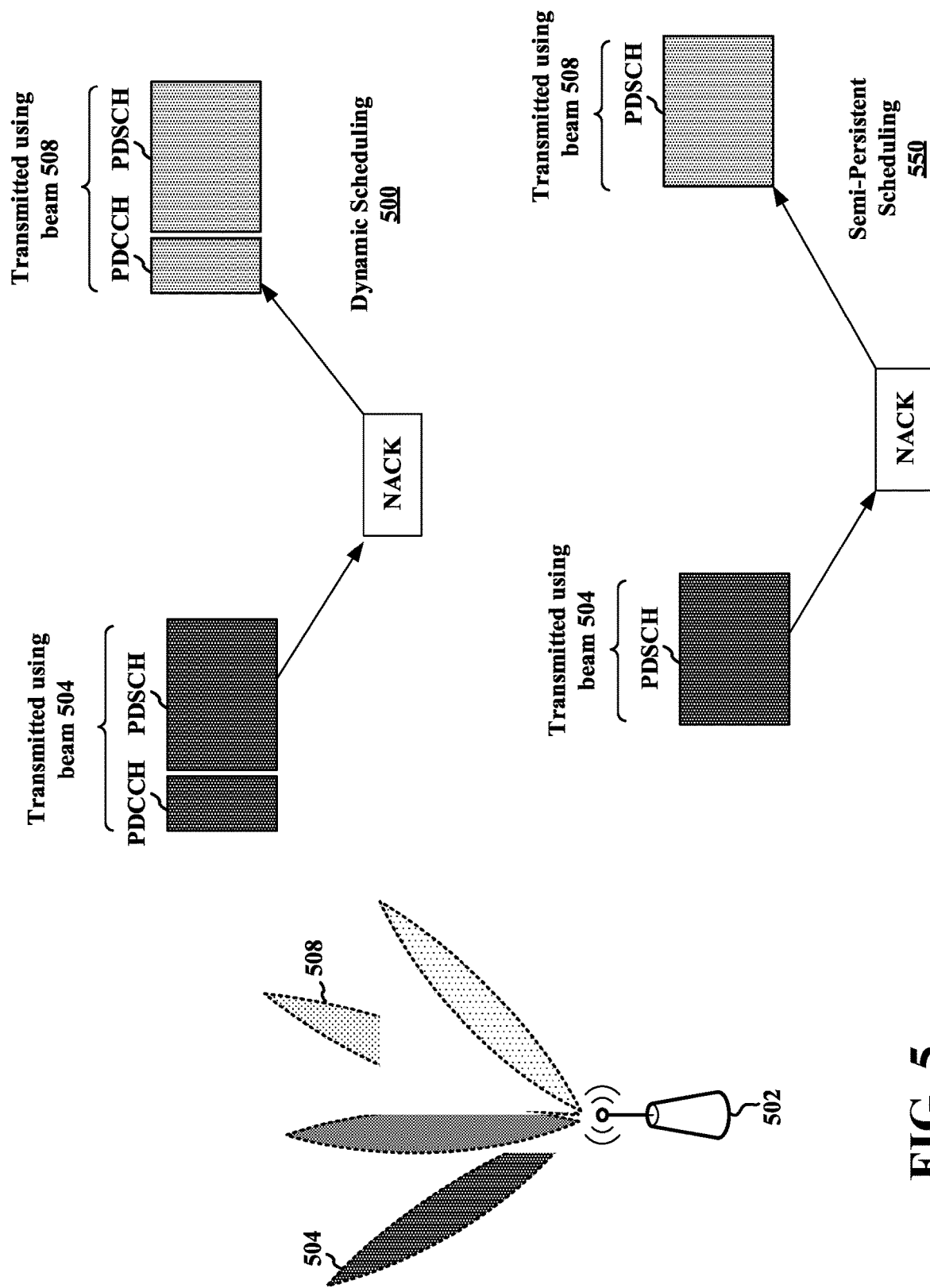
FIG. 5 illustrates examples of downlink shared channel communication.

In some aspects, the UE may determine to change from a current Type0/0A/2 PDCCH CSS set to a new Type0/0A/2 PDCCH CSS set to monitor for PDCCH based on a QCL assumption for unicast PDSCH reception. For example, the UE may fail to receive PDSCH 609 and/or may send a NACK 611 regarding the PDSCH. FIG. 5 illustrates an example of dynamic scheduling 500 and an example of semi-persistent scheduling (SPS) 550 that may be transmitted by base station 502 using beams, including beams 504, 508. In the dynamic scheduling example, PDCCH may schedule the corresponding PDSCH, whereas the PDSCH in the SPS example may be transmitted without a corresponding PDCCH, based on a prior scheduling of periodic resources for PDSCH. In either example, if the UE fails to decode PDSCH, the UE may send a NACK to the base station indicating the failure to decode the PDSCH. If the base station indicates a QCL assumption/TCI state change of the PDSCH following receiving the NACK, the indication may come after a next PDSCH transmission. The timing may be important, especially for URLLC communication. Thus, after a UE sends the NACK, the UE may switch the QCL assumption/TCI state for PDSCH reception without/prior to receiving an indication of new configuration from the base station. In the examples 500, 550 in FIG. 5, when the UE fails to decode PDSCH received from beam 504 and sends a NACK, the UE may switch to a new beam, e.g., beam 508, to receive the next transmission of PDSCH. The UE may similarly determine to change Type0/0A/2 PDCCH CSS set based on the failure to decode PDSCH and/or the transmission of the NACK.

Thus, a downlink SPS or uplink configured grant (CG) may be used by the UE as a default configuration for receiving PDSCH or transmitting uplink communication. If retransmission of downlink SPS is needed, the UE may begin monitoring PDCCH for retransmission of a downlink SPS over multiple CORESETs. Once retransmission is successful, the UE may assume the new QCL associated with the successful transmission for receiving future downlink SPS from the base station.

For SI/paging, once retransmission of unicast data (e.g., PDSCH) is successful, the UE may assume a new QCL based on the successful unicast data for receiving future downlink SPS from the base station. The QCL assumption may also be applied by the UE for receiving future SI/paging from the base station. The monitoring occasion of search space #0 may be based on the selected SSB/CSI-RS. Thus, the QCL of broadcast CORESET such as CORESET #0 may be reset after retransmission is successful. The QCL determined based on the retransmission may have an SSB as a QCL source. Together with the QCL update for SI/paging, the UE may update SI/paging occasions when the QCL for receiving downlink SPS is changed due to retransmission. The network may be able to identify if/when the UE changes the SI/paging occasions based on the HARQ feedback for the downlink SPS.

Thus, the connected mode UE may use the determination of one or more of a signal quality condition, expiration of a TA timer, a number of HARQ retransmissions, or negative feedback for unicast PDSCH reception as a basis for determining a new set of monitoring occasions to use for monitoring for PDCCH.

If a UE, e.g., an RRC connected UE, determines to change to a new Type0/0A/2 PDCCH CSS set to monitor for PDCCH based on condition(s) at the UE, the UE may report the change to the base station. As discussed herein, the UE may make the determination without an indication from the network to make the change and/or without a configuration change by the network that causes the UE to use a new Type0/0A/2 PDCCH CSS set. Therefore, the UE may provide an indication about the change to the base station. The UE may provide such an indication in a MAC CE, e.g., as illustrated at 617. The UE may provide an indication in UCI, e.g., as illustrated at 619. The UE may report a change indication that merely indicates that the UE changed or is changing a monitoring occasion for Type0/0A/2 PDCCH CSS set. In another example, the UE may report information about the new Type0/0A/2 PDCCH CSS set. For example, the UE may indicate to the base station an SSB, e.g., an SSB index, associated with the new Type0/0A/2 PDCCH CSS set selected by the UE. In another example, the UE send a message using a random access resource (e.g., a physical random access channel (PRACH) resource) that indicates the change, e.g., as illustrated at 621. The random access resource may be associated with a particular SSB, and therefore, may indicate to the base station that the UE is changing to a new Type0/0A/2 PDCCH CSS set associated with the particular SSB. Thus, in an example, the selection of a new Type0/0A/2 PDCCH CSS set by the UE may trigger the UE to send a PRACH transmission using the PRACH resource associated with the SSB that is associated with the new Type0/0A/2 PDCCH CSS set.

The UE uses the new Type0/0A/2 PDCCH CSS set to monitor for PDCCH, e.g., SI and/or paging, as illustrated at 623. The base station may determine the Type0/0A/2 PDCCH CSS set used by the UE, at 625, e.g., based on the indication provided by the UE, e.g., any of 611, 617, 619, or 621. The base station may use the new Type0/0A/2 PDCCH CSS set to transmit PDCCH to the UE.

Figure 7:
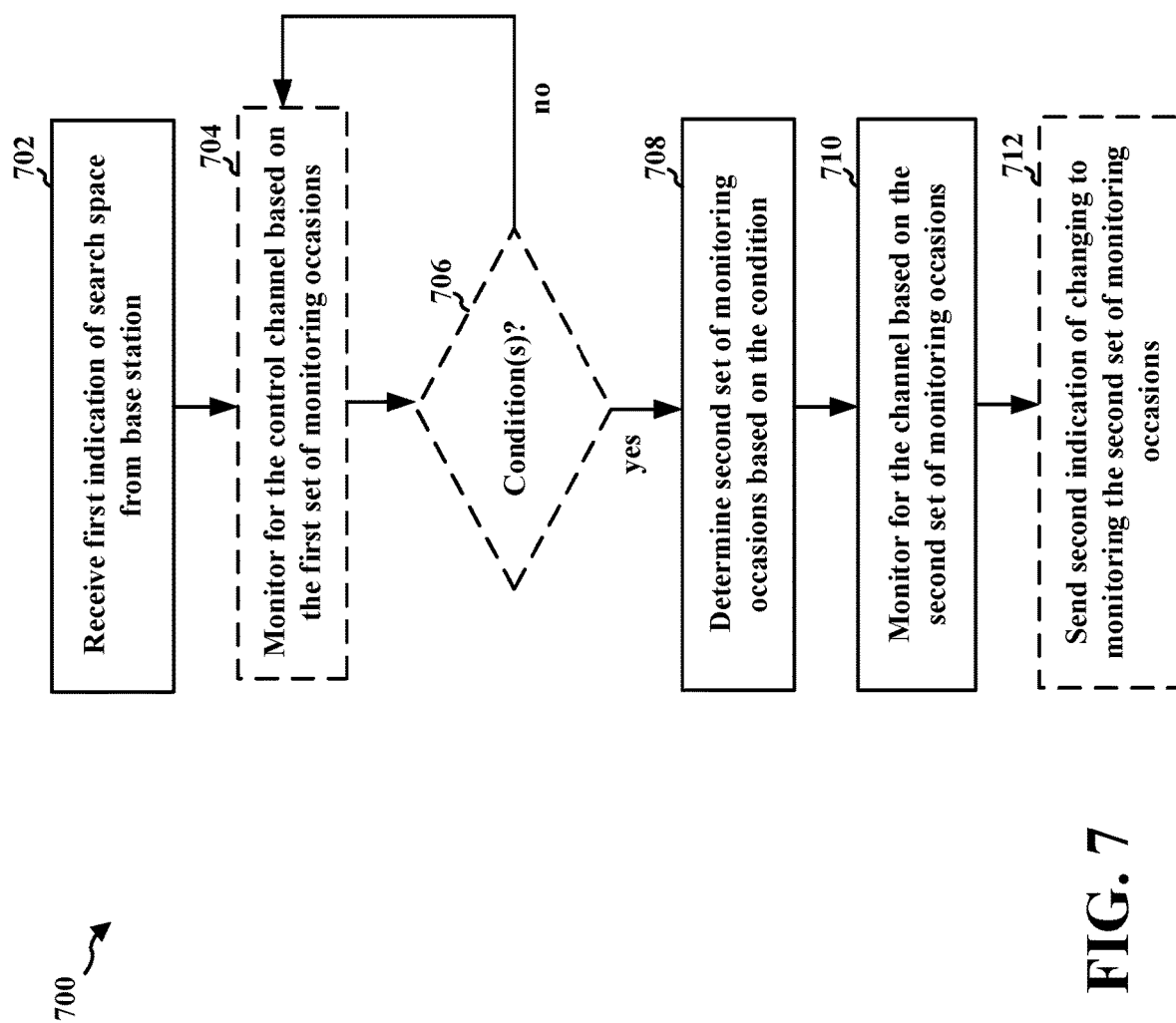
FIG. 7 is a flowchart of a method of wireless communication.

FIG. 7 is a flowchart 700 of a method of wireless communication. The method may be performed by a UE or a component of a UE (e.g., the UE 104, 350, 602; the apparatus 802). Optional aspects are illustrated with a dashed line. The method may enable the UE to select a new Type0/0A/2 PDCCH CSS set to use for monitoring for PDCCH based on changing conditions at the UE. The method may be performed by the UE while the UE operates in a connected mode, e.g., an RRC connected mode.

At 702, the UE receives, from a base station, a first indication of a search space for monitoring for a channel for at least one of system information, paging, or user data. For example, 702 may be performed by reception component 830 and/or search space component 840 of apparatus 802. A first set of monitoring occasions may be based on the search space indicated by the base station. In some aspects, the search space may be for monitoring for a control channel for at least one of the system information, the paging, or the user data. In some aspects, the search space may be for monitoring for a PDSCH for SPS.

In some aspects, for example at 704, the UE may monitor the first set of monitoring occasions, according to the information provided by the network. For example, 704 may be performed by monitor component 844 of apparatus 802. The UE may monitor for PDCCH, e.g., PDCCH scheduling PDSCH for SI and/or PDCCH scheduling PDSCH for paging.

At 708, the UE determines a second set of monitoring occasions different than the first set of monitoring occasions based on a condition experienced by the UE. For example, 708 may be performed by determination component 842 of apparatus 802. The UE may determine to use a different set of monitoring occasions than those indicated by the network based on conditions at the UE rather than based on an updated indication/configuration from the base station. In some aspects, for example at 706, the UE may determine whether such condition(s) exist. If the condition is not determined, the UE may continue to use the first set of monitoring occasions based on the indication from the base station. If the UE determines that such condition(s) exist, the UE may proceed to determine a new set of monitoring occasions, at 708.

In some aspects, the condition(s) may comprise a first signal quality associated with the first set of monitoring occasions and a second signal quality associated with the second set of monitoring occasions. The signal quality may be based on any of an L1/L3 RSRP, RSRQ, RSSI, and/or SINR. The UE may determine the second set of monitoring occasions based on at least one of the first signal quality associated with the first set of monitoring occasions being lower than a first threshold and/or the second signal quality associated with the second set of monitoring occasions being higher than a second threshold. In some aspects, the condition(s) may comprise expiration of a TA timer for a PCell or for a pTAG. In some aspects, the condition(s) may comprise a number of HARQ retransmissions for a HARQ process in a PCell exceeding a threshold. In some aspects, the condition(s) may comprise a change in a QCL assumption or a TCI state for reception of a downlink shared channel. The UE may perform the change in the QCL assumption or the TCI state for reception of the downlink shared channel based on determining negative feedback for the downlink shared channel.

At 710, the UE monitors for the channel based on the second set of monitoring occasions determined by the UE. For example, 710 may be performed by monitor component 844 of apparatus 802. In some aspects, the UE may monitor for a control channel based on the second set of monitoring occasions, selected by the UE, without an updated indication from the base station. The UE may operate in an RRC connected mode and may monitor for the control channel based on the second set of monitoring occasions, selected by the UE, without an updated indication from the base station.

In some aspects, for example at 712, the UE may send, to the base station, a second indication of changing to monitoring the second set of monitoring occasions. For example, 712 may be performed by the transmission component 834 and/or report component 846 of apparatus 802. In some aspects, the second indication may be comprised in a MAC CE. In some aspects, the second indication may be comprised in UCI. The second indication may comprise a change notification that indicates a change in monitoring occasions used by the UE. The second indication may indicate an SSB associated with the second set of monitoring occasions determined by the UE. The second indication may comprise a message sent by the UE using a random access resource associated with the SSB associated with the second set of monitoring occasions determined by the UE.

Figure 8:
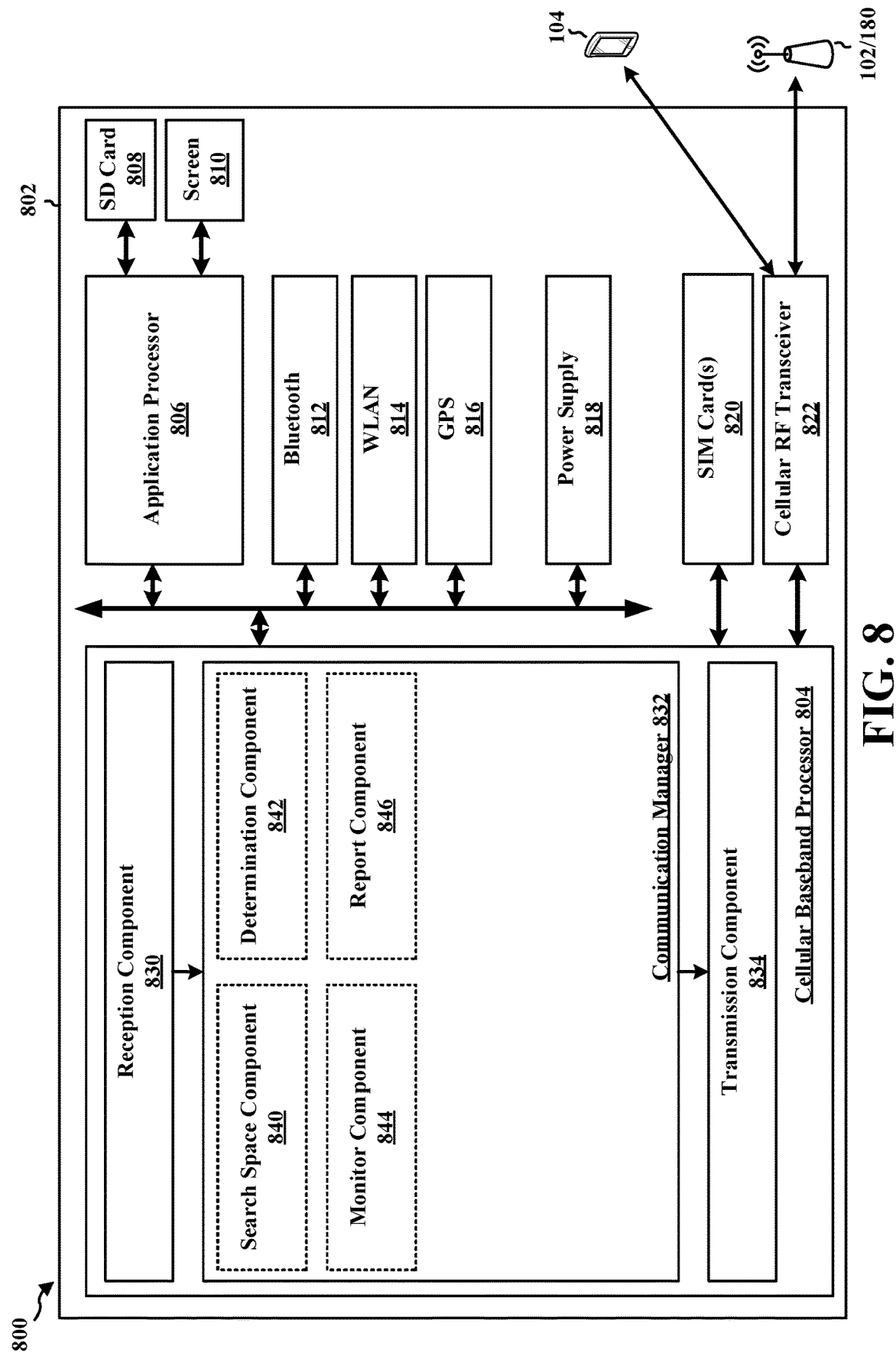
FIG. 8 is a diagram illustrating an example of a hardware implementation for an apparatus employing a processing system.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/ memory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/ processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 includes a search space component 840 that is configured to receive a first indication of a search space for monitoring for a channel for at least one of system information, paging, or user data, e.g., as described in connection with 702 of FIG. 7. The communication manager 832 further includes a determination component 842 that is configured to determine a second set of monitoring occasions different than the first set of monitoring occasions, e.g., as described in connection with 708 of FIG. 7. The communication manager 832 further includes a monitor component 844 that is configured to monitor for the channel based on the second set of monitoring occasions, e.g., as described in connection with 710 of FIG. 7. The communication manager 832 further includes a report component 846 that is configured to send a second indication of changing to monitoring the second set of monitoring occasions, e.g., as described in connection with 712 of FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving, from a base station, a first indication of a search space for monitoring for a channel for at least one of system information, paging, or scheduling information. A first set of monitoring occasions are based on the search space indicated by the base station. The apparatus includes means for determining a second set of monitoring occasions different than the first set of monitoring occasions based on a condition experienced by the UE. The apparatus includes means for monitoring for the channel based on the second set of monitoring occasions determined by the UE. The apparatus further includes means for sending, to the base station, a second indication of changing to monitoring the second set of monitoring occasions. The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
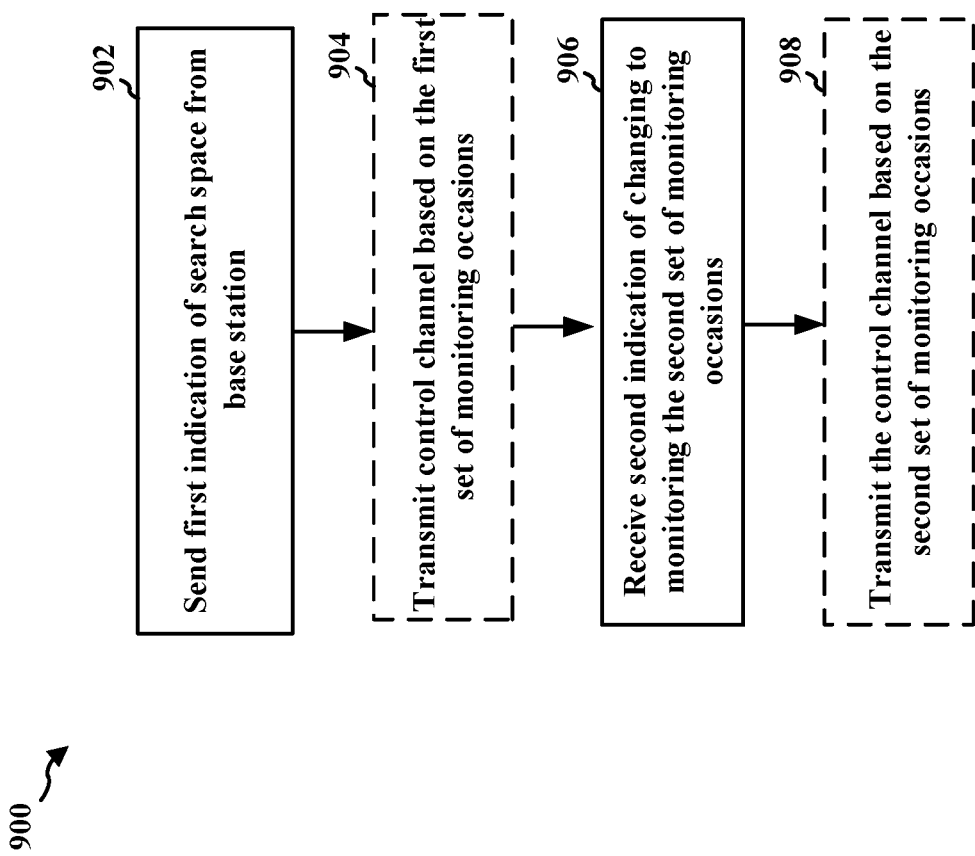
FIG. 9 is a flowchart of a method of wireless communication.

FIG. 9 is a flowchart 900 of a method of wireless communication. The method may be performed by a base station or a component of a base station (e.g., the base station 102/180, 310, 4012, 502, 604; the apparatus 1002). Optional aspects are illustrated with a dashed line. The method may enable faster beam changes for SI/paging based on conditions at a UE.

At 902, the base station sends, to a UE in a connected mode, a first indication of a search space for monitoring for a channel for at least one of system information, paging, or user data. For example, 902 may be performed by transmission component 1034 and/or search space component 1040 of apparatus 1002. A first set of monitoring occasions are based on the search space indicated by the base station. The base station may then transmit a control channel to the UE, e.g., PDCCH scheduling PDSCH for SI and/or PDCCH scheduling PDSCH for paging, based on the indicated set of monitoring occasions, for example at 1004. The transmission of the control channel may be performed by the channel component 1044 of apparatus 1002. In some aspects, the search space may be for monitoring for a control channel for at least one of the system information, the paging, or the user data. In some aspects, the search space may be for monitoring for a PDSCH for SPS.

At 906, the base station receives from the UE, a second indication that the UE will change to monitoring a second set of monitoring occasions that is different than the first set of monitoring occasions indicated to the UE by the base station. For example, 906 may be performed by reception component 1030 and/or report component 1046 of apparatus 1002. The second indication may be based on a condition detected at the UE, e.g., as described in connection with 706, 708 in FIG. 7. The second indication may comprise negative feedback (e.g., a NACK) for a downlink shared channel (e.g., PDSCH) that informs the base station that the UE will select a new beam and corresponding SSB to monitor. In some aspects, the second indication may be comprised in a MAC CE. In some aspects, the second indication may be comprised in UCI. In some aspects, the second indication may comprise a change notification that indicates a change in monitoring occasions used by the UE. The second indication may indicate an SSB associated with the second set of monitoring occasions determined by the UE. The second indication may comprise a message sent by the UE using a random access resource associated with the SSB associated with the second set of monitoring occasions determined by the UE.

The base station may use the second indication, received at 906, to determine a second set of monitoring occasions to use for PDCCH transmissions to the UE. The determination may be performed, e.g., by determination component 1042 of apparatus 1002. The base station may transmit a channel to the UE. In some aspects, the base station may transmit a channel to the UE. In some aspects, the base station may transmit a control channel to the UE, e.g., PDCCH scheduling PDSCH for SI and/or PDCCH scheduling PDSCH for paging, based on the second set of monitoring occasions, at 908. For example, 908 may be performed by channel component 1044 of apparatus 1002.

Figure 10:
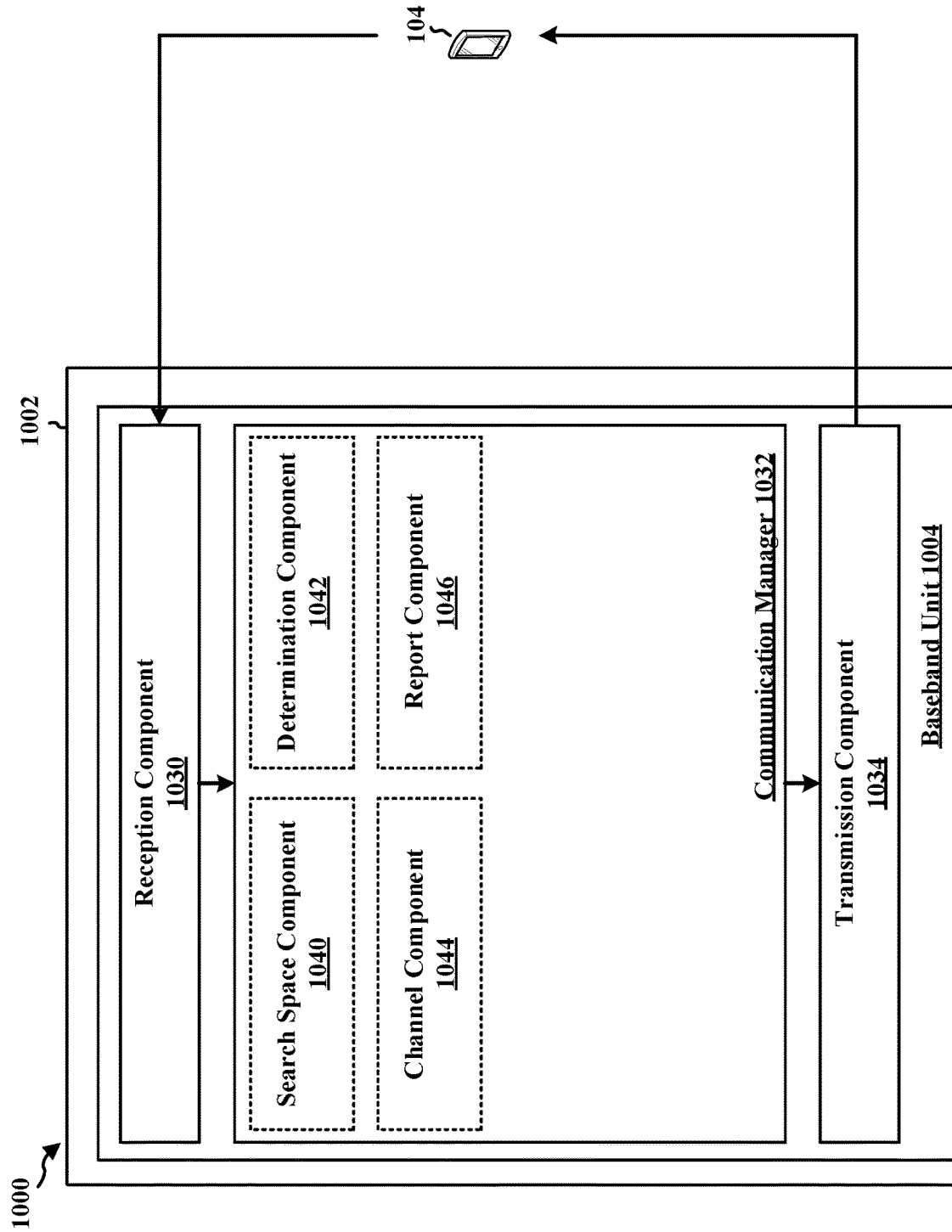
FIG. 10 is a diagram illustrating an example of a hardware implementation for an apparatus employing a processing system.

FIG. 10 is a diagram 1000 illustrating an example of a hardware implementation for an apparatus 1002. The apparatus 1002 is a base station and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a search space component 1040 that sends a first indication of a search space for monitoring for a channel for at least one of system information, paging, or scheduling information, e.g., as described in connection with 902 of FIG. 9. The communication manager 1032 further includes a determination component 1042 that determines a second set of monitoring occasions to use for PDCCH transmissions to the UE, e.g., as described in connection with 906 of FIG. 9. The communication manager 1032 further includes a channel component 1044 that transmits a channel to the UE, e.g., as described in connection with 908 of FIG. 9. The communication manager 1032 further includes a report component 1046 that receives a second indication that the UE will change to monitoring a second set of monitoring occasions that is different than the first set of monitoring occasions, e.g., as described in connection with 910 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for sending, to a UE in a connected mode, a first indication of a search space for monitoring for a channel for at least one of system information, paging, or scheduling information. A first set of monitoring occasions are based on the search space indicated by the base station. The apparatus includes means for receiving, from the UE, a second indication that the UE will change to monitoring a second set of monitoring occasions that is different than the first set of monitoring occasions indicated to the UE by the base station. The apparatus further includes means for transmitting a control channel to the UE based on the first or second set of monitoring occasions. The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teaching described herein, without limitation.

Example 1 is a method of wireless communication at a UE operating in a connected mode comprising receiving, from a base station, a first indication of a search space for monitoring for a channel for at least one of system information, paging, or user data, wherein a first set of monitoring occasions are based on the search space indicated by the base station; determining a second set of monitoring occasions different than the first set of monitoring occasions based on a condition experienced by the UE; and monitoring for the channel based on the second set of monitoring occasions determined by the UE.

In Example 2, the method of Example 1 further includes that the search space is for monitoring for a control channel for at least one of the system information, the paging, or the user data.

In Example 3, the method of Example 1 or 2 further includes that the search space is for monitoring for a PDSCH for SPS.

In Example 4, the method of any of Examples 1-3 further includes that the UE operates in an RRC connected mode and monitors for a control channel based on the second set of monitoring occasions without an updated indication from the base station.

In Example 5, the method of any of Examples 1-4 further includes that the condition comprises a first signal quality associated with the first set of monitoring occasions and a second signal quality associated with the second set of monitoring occasions.

In Example 6, the method of any of Examples 1-5 further includes that the UE determines the second set of monitoring occasions based on at least one of the first signal quality associated with the first set of monitoring occasions being lower than a first threshold or the second signal quality associated with the second set of monitoring occasions being higher than a second threshold.

In Example 7, the method of any of Examples 1-6 further includes that the condition comprises expiration of a TA timer for a PCell or for a pTAG.

In Example 8, the method of any of Examples 1-7 further includes that the condition comprises a number of HARQ retransmissions for a HARQ process in a PCell exceeding a threshold.

In Example 9, the method of any of Examples 1-8 further includes that the condition comprises a change in a QCL assumption or a TCI state for reception of a downlink shared channel.

In Example 10, the method of any of Examples 1-9 further includes that the UE performs the change in the QCL assumption or the TCI state for reception of the downlink shared channel based on determining negative feedback for the downlink shared channel.

In Example 11, the method of any of Examples 1-10 further includes sending, to the base station, a second indication of changing to monitoring the second set of monitoring occasions.

In Example 12, the method of any of Examples 1-11 further includes that the second indication is comprised in a MAC CE.

In Example 13, the method of any of Examples 1-12 further includes that the second indication is comprised in UCI.

In Example 14, the method of any of Examples 1-13 further includes that the second indication comprises a change notification that indicates a change in monitoring occasions used by the UE.

In Example 15, the method of any of Examples 1-14 further includes that the second indication indicates a synchronization signal block (SSB) associated with the second set of monitoring occasions determined by the UE.

In Example 16, the method of any of Examples 1-15 further includes that the second indication comprises a message sent by the UE using a random access resource associated with the SSB associated with the second set of monitoring occasions determined by the UE.

Example 17 is a device including one or more processors and one or more memories in electronic communication with the one or more processors storing instructions executable by the one or more processors to cause the system or apparatus to implement a method as in any of Examples 1-16.

Example 18 is a system or apparatus including means for implementing a method or realizing an apparatus as in any of Examples 1-16.

Example 19 is a non-transitory computer readable medium storing instructions executable by one or more processors to cause the one or more processors to implement a method as in any of Examples 1-16.

Example 20 is a method of wireless communication at a base station comprising sending, to a UE in a connected mode, a first indication of a search space for monitoring for a channel for at least one of system information, paging, or user data, wherein a first set of monitoring occasions are based on the search space indicated by the base station; and receiving, from the UE, a second indication that the UE will change to monitoring a second set of monitoring occasions that is different than the first set of monitoring occasions indicated to the UE by the base station.

In Example 21, the method of Example 20 further includes that the search space is for monitoring for a control channel for at least one of the system information, the paging, or the user data.

In Example 22, the method of any of Examples 20 or 21 further includes that the search space is for monitoring for a PDSCH for SPS.

In Example 23, the method of any of Examples 20-22 further includes that the second indication comprises negative feedback for a downlink shared channel.

In Example 24, the method of any of Examples 20-23 further includes that the second indication is comprised in a MAC CE.

In Example 25, the method of any of Examples 20-24 further includes that the second indication is comprised in UCI.

In Example 26, the method of any of Examples 20-25 further includes that the second indication comprises a change notification that indicates a change in monitoring occasions for the UE.

In Example 27, the method of any of Examples 20-26 further includes that the second indication indicates a SSB associated with the second set of monitoring occasions.

In Example 28, the method of any of Examples 20-27 further includes that the second indication comprises a message received from the UE using a random access resource associated with the SSB associated with the second set of monitoring occasions.

Example 29 is a device including one or more processors and one or more memories in electronic communication with the one or more processors storing instructions executable by the one or more processors to cause the system or apparatus to implement a method as in any of Examples 20-28.

Example 30 is a system or apparatus including means for implementing a method or realizing an apparatus as in any of Examples 20-28.

Example 31 is a non-transitory computer readable medium storing instructions executable by one or more processors to cause the one or more processors to implement a method as in any of Examples 20-28.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if" "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE) operating in a connected mode, the method comprising:
   receiving, from a base station, a first indication of a search space for monitoring a channel on a first set of monitoring occasions based on the search space for at least one of system information, paging, or user data;
   determining a second set of monitoring occasions different than the first set of monitoring occasions based on a condition experienced by the UE; and
   monitoring for the channel based on the second set of monitoring occasions determined by the UE prior to transmitting an indication of a change in the monitoring.

2. The method of claim 1, wherein the search space is for monitoring for a control channel for at least one of the system information, the paging, or the user data.

3. The method of claim 1, wherein the search space is for monitoring for a physical downlink shared channel (PDSCH) for semi-persistent scheduling (SPS).

4. The method of claim 1, wherein the UE operates in a radio resource control (RRC) connected mode and monitors for a control channel based on the second set of monitoring occasions without an updated indication from the base station.

5. The method of claim 1, wherein the condition comprises a first signal quality associated with the first set of monitoring occasions and a second signal quality associated with the second set of monitoring occasions.

6. The method of claim 5, wherein the UE determines the second set of monitoring occasions based on at least one of the first signal quality associated with the first set of monitoring occasions being lower than a first threshold or the second signal quality associated with the second set of monitoring occasions being higher than a second threshold.

7. The method of claim 1, wherein the condition comprises expiration of a timing alignment (TA) timer for a primary cell (PCell) or for a primary timing advance group (pTAG).

8. The method of claim 1, wherein the condition comprises a number of Hybrid Automatic Repeat Request (HARQ) retransmissions for a HARQ process in a primary cell (PCell) exceeding a threshold.

9. The method of claim 1, wherein the condition comprises a change in a quasi-co-location (QCL) assumption or a transmission configuration indication (TCI) state for reception of a downlink shared channel.

10. The method of claim 9, wherein the UE performs the change in the QCL assumption or the TCI state for reception of the downlink shared channel based on determining negative feedback for the downlink shared channel.

11. The method of claim 1, further comprising:
    sending, to the base station, a second indication of changing to monitoring the second set of monitoring occasions.

12. The method of claim 11, wherein the second indication is comprised in a medium access control (MAC) control element (CE).

13. The method of claim 11, wherein the second indication is comprised in uplink control information (UCI).

14. The method of claim 11, wherein the second indication comprises a change notification that indicates a change in monitoring occasions used by the UE.

15. The method of claim 11, wherein the second indication indicates a synchronization signal block (SSB) associated with the second set of monitoring occasions determined by the UE.

16. The method of claim 15, wherein the second indication comprises a message sent by the UE using a random access resource associated with the SSB associated with the second set of monitoring occasions determined by the UE.

17. A method of wireless communication at a base station, the method comprising:
    sending, to a user equipment (UE) in a connected mode, a first indication of a search space for monitoring a channel on a first set of monitoring occasions based on the search space for at least one of system information, paging, or user data; and
    receiving, from the UE, a second indication indicating a change in monitoring to a second set of monitoring occasions different than the first set of monitoring occasions after occurrence of the monitoring on the second set of monitoring occasions at the UE.

18. The method of claim 17, wherein the search space is for monitoring for a control channel for at least one of the system information, the paging, or the user data.

19. The method of claim 17, wherein the search space is for monitoring for a physical downlink shared channel (PDSCH) for semi-persistent scheduling (SPS).

20. The method of claim 17, wherein the second indication comprises negative feedback for a downlink shared channel.

21. The method of claim 17, wherein the second indication is comprised in a medium access control (MAC) control element (CE).

22. The method of claim 17, wherein the second indication is comprised in uplink control information (UCI).

23. The method of claim 17, wherein the second indication comprises a change notification that indicates a change in monitoring occasions for the UE.

24. The method of claim 17, wherein the second indication indicates a synchronization signal block (SSB) associated with the second set of monitoring occasions.

25. The method of claim 24, wherein the second indication comprises a message received from the UE using a random access resource associated with the SSB associated with the second set of monitoring occasions.

26. An apparatus for wireless communication at a user equipment (UE) operating in a connected mode, comprising:
    a memory; and
    at least one processor coupled to the memory and configured to:
        receive, from a base station, a first indication of a search space for monitoring a channel on a first set of monitoring occasions based on the search space for at least one of system information, paging, or user data;
        determine a second set of monitoring occasions different than the first set of monitoring occasions based on a condition experienced by the UE; and
        monitor for the channel based on the second set of monitoring occasions determined by the UE prior to transmitting an indication of a change in the monitoring.

27. The apparatus of claim 26, wherein search space is for monitoring for a control channel for at least one of the system information, the paging, or the user data.

28. The apparatus of claim 26, wherein the search space is for monitoring for a physical downlink shared channel (PDSCH) for semi-persistent scheduling (SPS).

29. The apparatus of claim 26, wherein the condition comprises at least one of:
    a first signal quality associated with the first set of monitoring occasions and a second signal quality associated with the second set of monitoring occasions;
    expiration of a timing alignment (TA) timer for a primary cell (PCell) or for a primary timing advance group (pTAG);
    a number of Hybrid Automatic Repeat Request (HARQ) retransmissions for a HARQ process in a primary cell (PCell) exceeding a threshold; or
    a change in a quasi-co-location (QCL) assumption or a transmission configuration indication (TCI) state for reception of a downlink shared channel.

30. An apparatus for wireless communication at a base station, comprising:
    a memory; and
    at least one processor coupled to the memory and configured to:
        send, to a user equipment (UE) in a connected mode, a first indication of a search space for monitoring a channel on a first set of monitoring occasions based on the search space for at least one of system information, paging, or user data; and
        receive, from the UE, a second indication indicating a change in monitoring to a second set of monitoring occasions different than the first set of monitoring occasions after occurrence of the monitoring on the second set of monitoring occasions at the UE.

* * * * *